(12) United States Patent
Sriver

(10) Patent No.: US 9,514,102 B2
(45) Date of Patent: Dec. 6, 2016

(54) USER INTERFACE FOR PRESENTATION OF A DOCUMENT

(71) Applicant: GOOGLE INC., Mountain View, CA (US)

(72) Inventor: Joe Sriver, Minneapolis, MN (US)

(73) Assignee: Google Inc., Mountain View, CA (US)

( * ) Notice: Subject to any disclaimer, the term of this patent is extended or adjusted under 35 U.S.C. 154(b) by 436 days.

(21) Appl. No.: 14/039,819

(22) Filed: Sep. 27, 2013

(65) Prior Publication Data

US 2014/0026040 A1    Jan. 23, 2014

Related U.S. Application Data

(63) Continuation of application No. 10/952,443, filed on Sep. 29, 2004, now abandoned.

(51) Int. Cl.
G06F 3/00 (2006.01)
G06F 17/21 (2006.01)
G06F 17/30 (2006.01)

(52) U.S. Cl.
CPC ....... *G06F 17/217* (2013.01); *G06F 17/30873* (2013.01)

(58) Field of Classification Search
CPC .......................... G06F 17/30873; G06F 17/217
See application file for complete search history.

(56) References Cited

U.S. PATENT DOCUMENTS

| | | |
|---|---|---|
| 5,717,940 A | 2/1998 | Peairs |
| 5,860,074 A | 1/1999 | Rowe et al. |
| 5,963,966 A | 10/1999 | Mitchell et al. |
| 6,415,307 B2 | 7/2002 | Jones et al. |
| 6,970,145 B1 | 11/2005 | Aoki |
| 7,373,314 B2 | 5/2008 | Aliabadi et al. |
| 7,412,409 B2 | 8/2008 | Aliabadi et al. |
| 2001/0047373 A1 | 11/2001 | Jones et al. |
| 2002/0120646 A1* | 8/2002 | Dutta ................ G06F 17/30899 715/205 |
| 2002/0154159 A1* | 10/2002 | Day ...................... G06F 3/0481 715/738 |
| 2002/0163545 A1 | 11/2002 | Hii |
| 2004/0122808 A1* | 6/2004 | Martin ................... G06Q 30/02 |
| 2004/0133469 A1* | 7/2004 | Chang ................ G06Q 30/0255 705/14.53 |
| 2004/0181516 A1 | 9/2004 | Ellwanger et al. |

(Continued)

OTHER PUBLICATIONS

Amazon: "Books Search Inside the Book", Internet Publication: Jul. 18, 2004 using wayback machine hereinafter referred to as Amazon.*

(Continued)

*Primary Examiner* — Sara England
(74) *Attorney, Agent, or Firm* — Fenwick & West LLP

(57) ABSTRACT

A system identifies a document and provides an excerpt page corresponding to the document. The excerpt page includes a page of the document and a set of links to sections of the document. One of the links corresponds to a section containing the page and includes text associated with the link, a next page element to permit a next page in the document to be presented, and a previous page element to permit a previous page in the document to be presented. The next page element and the previous page element are visually associated with the text associated with the link.

20 Claims, 7 Drawing Sheets

(56) References Cited

U.S. PATENT DOCUMENTS

2005/0197893 A1    9/2005   Landau et al.
2006/0069670 A1    3/2006   Khaliq et al.

OTHER PUBLICATIONS

Adobe Systems: "Adobe Acrobat Reader 6.0 Online Guide"; Internet Publication; 2003; http://www.biochem.unizh.ch/biocinfo/Programme/AcroRead/acrruserguide.pdf; hereinafter, Adobe.*
http://amazon.com/exec/obidos/subst/home/home.html/103-5235127-4551035 printed Aug. 12, 2004, herinafter "Amazon Reference 2".*
Watanabe, et al., "Visual Interface for Retrieval of Electronic-formed Books", IEEE Jul. 1993, pp. 692-695.
Adobe Systems: "Adobe Acrobat Reader 6.0 Online Guide"; Internet Publication; 2003; http://www.biochem.unizh.ch/biocinfo/Programme/AcroRead/acrruserguide.pdf; print date (Dec. 12, 2005); 113 pages.
Amazon; "Books Search Inside the Book"; Internet Publication; Jul. 18, 2004; www.amazon.com; print date (Dec. 12, 2005); 3 pages.
Barnes & Noble.com—Book Search; www.bn.com; Aug. 12, 2004 (print date); pp. 1-5.
Amazon.com—Book Search; http://www.amazon.com; Aug. 12, 2004 (print date); pp. 1-16.
Google Search; http://catalogs.google.com; Aug. 12, 2004 (print date); pp. 1-7.
International Search Report for corresponding PCT application with a mailing date of Jan. 2, 2006; 4 pages.
Co-pending U.S. Appl. No. 10/952,443, by Joe Sriver, entitled "User Interface for Presentation of a Document," filed Sep. 29, 2004, 31 pages.

* cited by examiner

FIG. 4

Google

PRINT | MEMORY | [SEARCH]

HARNESSING THE RAGE — 412
BY DR. BRUCE BANNER — 414

[HARNESSING THE RAGE / DR. BRUCE BANNER image]

PAGE 114: "... If your brain judges the information important, it places it in your memory "files." The part of your brain responsible for processing memory is the ... Due to this anatomical organization, declarative memory is said to be controlled by higher brain ... while procedural memory ..." — 416

HTTP://ADDRESS123.COM/12345.HTM — 418

109 RESULTS FOR MEMORY, VIEW PAGE: 5-10, 12, 21-23, 26-30, ... — 420

WE ARE ALL SUPERMEN
BY CLARK KENT

[WE ARE ALL SUPERMEN / CLARK KENT image]

PAGE 3: "... Everyone can do superhuman things. For example, we have all heard stories in which a mother of two lifts a heavy object, like a car, off of her child, but has no memory of doing it. We call such stories fables ... caused by a rush of adrenaline that produces superhuman strength ..."

HTTP://ADDRESS456.COM/ABCDEF.HTM

10 RESULTS FOR MEMORY, VIEW PAGE: 8, 12, 33-35, 41, 49-51

[ AD(S) ASSOCIATED WITH DOCUMENT(S) ]

410 {  422

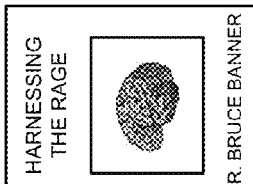

USER INTERFACE FOR PRESENTATION OF A DOCUMENT

RELATED APPLICATION

This application is a continuation of U.S. patent application Ser. No. 10/952,443, filed Sep. 29, 2004, the contents of which are incorporated herein by reference.

BACKGROUND

Field of the Invention

Systems and methods consistent with the principles of the invention relate generally to information retrieval and, more particularly, to a user interface for the presentation of information regarding a document.

Description of Related Art

Modern computer networks, and in particular, the Internet, have made large bodies of information widely and easily available. Free Internet search engines, for instance, index many millions of web documents that are linked to the Internet. A user connected to the Internet can enter a simple search query to quickly locate web documents relevant to the search query.

One category of content that is not widely available on the Internet, however, includes the more traditional printed works of authorship, such as books and magazines. One impediment to making such works digitally available is that it can be difficult to convert printed versions of the works to digital form. Optical character recognition (OCR), which is the act of using an optical scanning device to generate images of text that are then converted to characters in a computer-readable format (e.g., an ASCII file), is a known technique for converting printed text to a useful digital form. OCR systems generally include an optical scanner for generating images of printed pages and software for analyzing the images.

SUMMARY

According to one aspect, a method may include receiving a search query, identifying a document based on the search query, and providing an excerpt page corresponding to the document. The excerpt page may include a page of the document and a set of links to sections of the document. One of the links corresponds to the page and includes text describing the link, a next page element to permit a next page in the document to be presented, and a previous page element to permit a previous page in the document to be presented. The next page element and the previous page element are visually associated with the text describing the link.

According to another aspect, a graphical user interface embodied in a computer-readable medium may include an image of a page from a document, a first link to a first section of the document, and text associated with a second link to a second section of the document, where the page is included in the second section of the document. A next page element and a previous page element are visually associated with the text associated with the second link. The next page element permits an image of a next page from the document to be presented and the previous page element permits an image of a previous page from the document to be presented.

According to a further aspect, a system may include means for identifying a document and means for providing an excerpt page corresponding to the document. The excerpt page may include a page of the document and a set of links to sections of the documents. One of the links corresponds to a section containing the page and includes text associated with the link, a next page element to permit a next page in the document to be presented, and a previous page element to permit a previous page in the document to be presented. The next page element and the previous page element are visually associated with the text associated with the link.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention.

Overview

More and more types of documents are becoming searchable via search engines. For example, some documents, such as books, magazines, and/or catalogs, may be scanned and their text recognized via OCR. It is beneficial to present information regarding these and other types of documents in a manner that is useful to users seeking such information.

Systems and methods consistent with the principles of the invention may provide information regarding documents in a manner that is useful to users interested in the documents.

Exemplary Network Configuration

Figure 1:
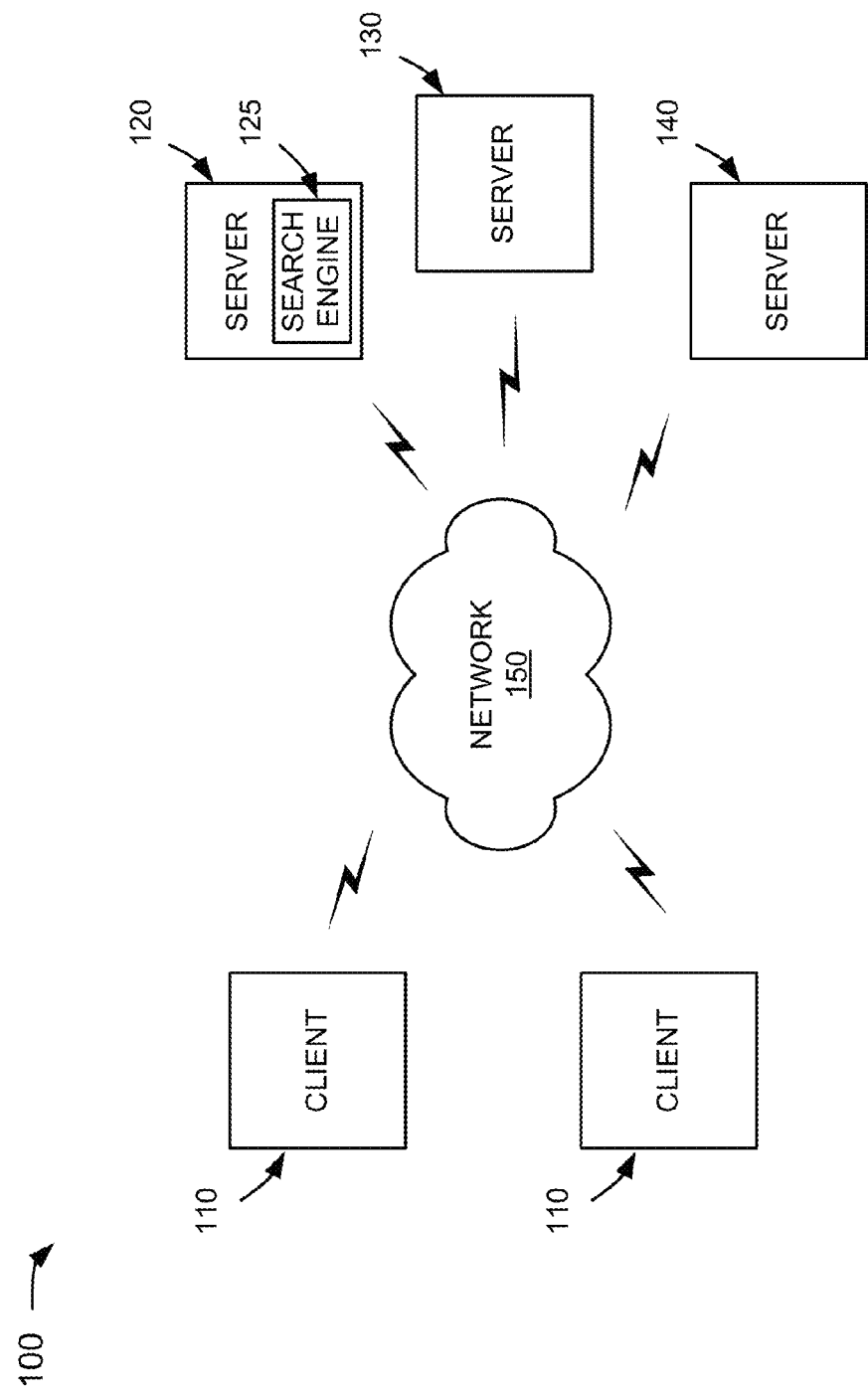
FIG. 1 is an exemplary diagram of a network in which systems and methods consistent with the principles of the invention may be implemented.

FIG. 1 is an exemplary diagram of a network 100 in which systems and methods consistent with the principles of the invention may be implemented. Network 100 may include multiple clients 110 connected to multiple servers 120-140 via a network 150. Two clients 110 and three servers 120-140 have been illustrated as connected to network 150 for simplicity. In practice, there may be more or fewer clients and servers. Also, in some instances, a client may perform the functions of a server and a server may perform the functions of a client.

Clients 110 may include client entities. An entity may be defined as a device, such as a wireless telephone, a personal computer, a personal digital assistant (PDA), a lap top, or another type of computation or communication device, a thread or process running on one of these devices, and/or an object executable by one of these devices. Servers 120-140 may include server entities that gather, process, search, and/or maintain documents in a manner consistent with the principles of the invention.

In an implementation consistent with the principles of the invention, server 120 may include a search engine 125 usable by clients 110. Server 120 may crawl a corpus of documents (e.g., web documents), index the documents, and store information associated with the documents in a repository of documents. Alternatively or additionally, server 120 may analyze a database (or set of databases) of documents (e.g., books, magazines, newspapers, articles, catalogs, etc.), obtained electronically by scanning or otherwise, and store information associated with the documents in the same or a different repository. Servers 130 and 140 may store or maintain documents that may be crawled or analyzed by server 120.

While servers 120-140 are shown as separate entities, it may be possible for one or more of servers 120-140 to perform one or more of the functions of another one or more of servers 120-140. For example, it may be possible that two or more of servers 120-140 are implemented as a single server. It may also be possible for a single one of servers 120-140 to be implemented as two or more separate (and possibly distributed) devices.

Network 150 may include a local area network (LAN), a wide area network (WAN), a telephone network, such as the Public Switched Telephone Network (PSTN), an intranet, the Internet, a memory device, or a combination of networks. Clients 110 and servers 120-140 may connect to network 150 via wired, wireless, and/or optical connections.

Exemplary Client/Server Architecture

Figure 2:
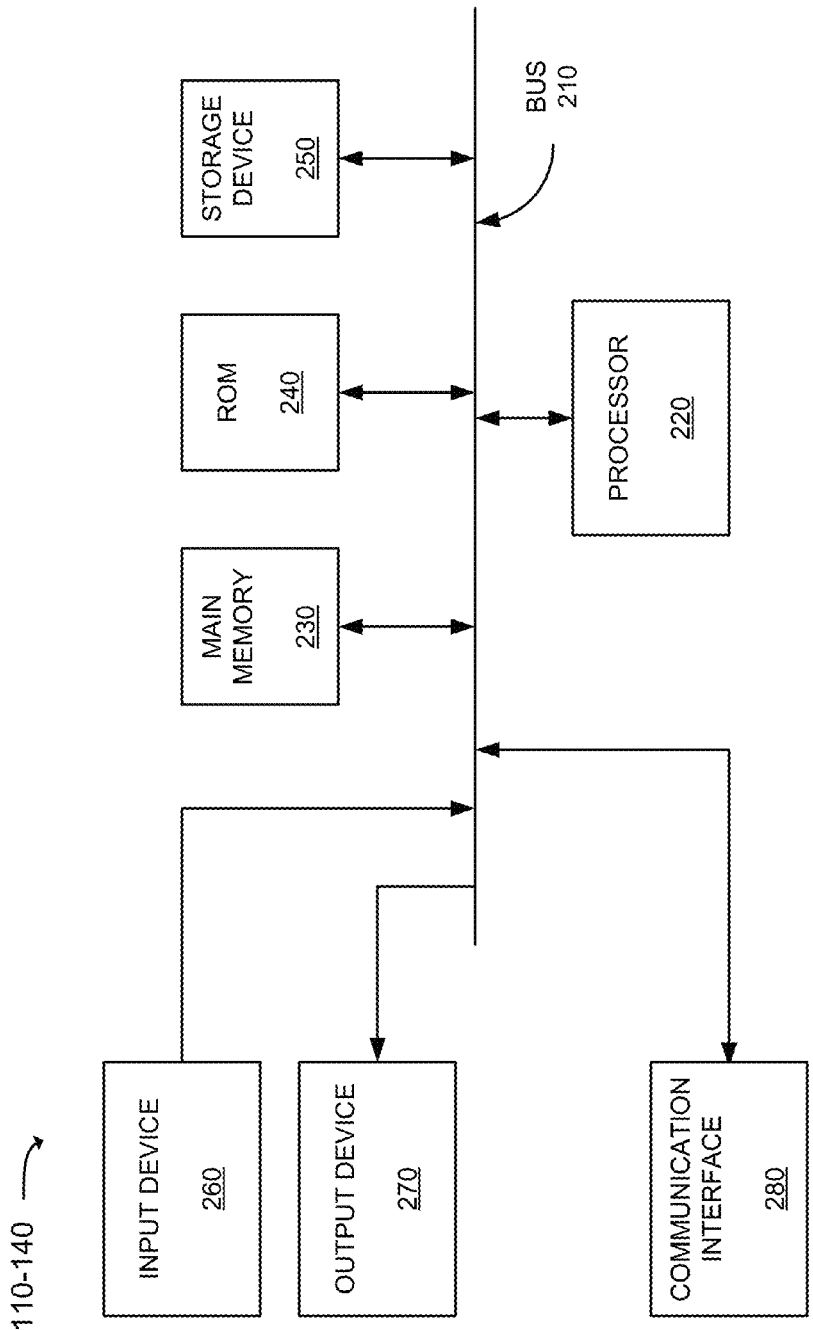
FIG. 2 is an exemplary diagram of a client or server of FIG. 1 according to an implementation consistent with the principles of the invention.

FIG. 2 is an exemplary diagram of a client or server entity (hereinafter called "client/server entity"), which may correspond to one or more of clients 110 and/or servers 120-140, according to an implementation consistent with the principles of the invention. The client/server entity may include a bus 210, a processor 220, a main memory 230, a read only memory (ROM) 240, a storage device 250, an input device 260, an output device 270, and a communication interface 280. Bus 210 may include a path that permits communication among the elements of the client/server entity.

Processor 220 may include a conventional processor, microprocessor, or processing logic that interprets and executes instructions. Main memory 230 may include a random access memory (RAM) or another type of dynamic storage device that may store information and instructions for execution by processor 220. ROM 240 may include a conventional ROM device or another type of static storage device that may store static information and instructions for use by processor 220. Storage device 250 may include a magnetic and/or optical recording medium and its corresponding drive.

Input device 260 may include a conventional mechanism that permits an operator to input information to the client/server entity, such as a keyboard, a mouse, a pen, voice recognition and/or biometric mechanisms, etc. Output device 270 may include a conventional mechanism that outputs information to the operator, including a display, a printer, a speaker, etc. Communication interface 280 may include any transceiver-like mechanism that enables the client/server entity to communicate with other devices and/or systems. For example, communication interface 280 may include mechanisms for communicating with another device or system via a network, such as network 150.

As will be described in detail below, the client/server entity, consistent with the principles of the invention, may perform certain document processing-related operations. The client/server entity may perform these operations in response to processor 220 executing software instructions contained in a computer-readable medium, such as memory 230. A computer-readable medium may be defined as a physical or logical memory device and/or carrier wave.

The software instructions may be read into memory 230 from another computer-readable medium, such as data storage device 250, or from another device via communication interface 280. The software instructions contained in memory 230 may cause processor 220 to perform processes that will be described later. Alternatively, hardwired circuitry may be used in place of or in combination with software instructions to implement processes consistent with the principles of the invention. Thus, implementations consistent with the principles of the invention are not limited to any specific combination of hardware circuitry and software.

Exemplary Processing

Figure 3:
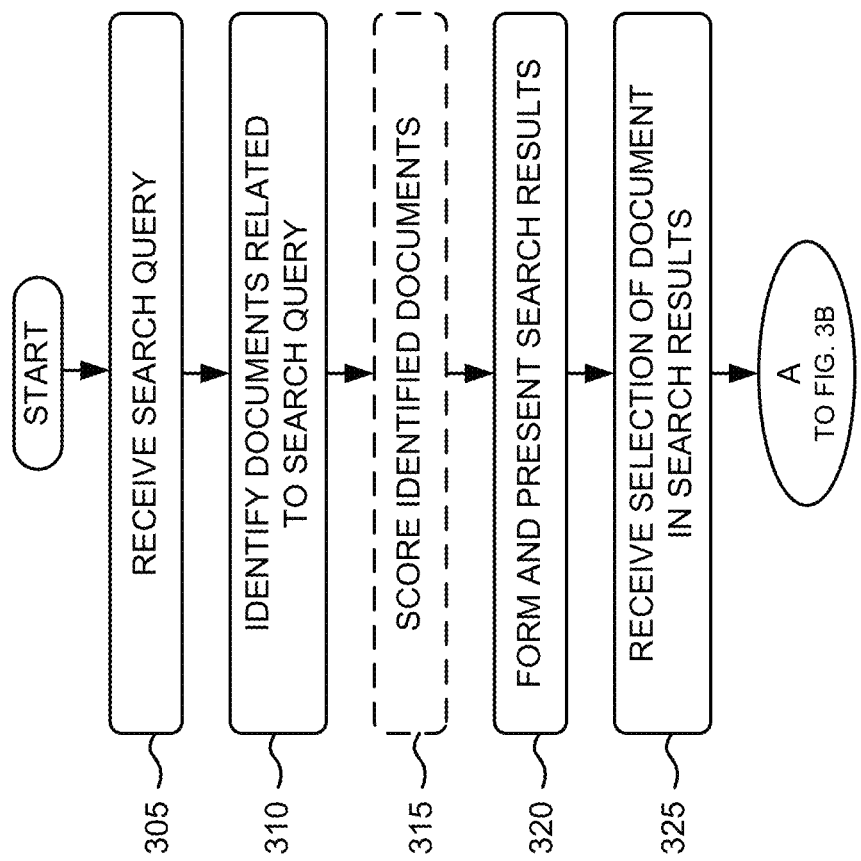
FIGS. 3A and 3B are flowcharts of exemplary processing for presenting information regarding a document related to a search query according to an implementation consistent with the principles of the invention.

FIGS. 3A and 3B are flowcharts of exemplary processing for presenting information regarding a document related to a search query according to an implementation consistent with the principles of the invention. Processing may begin with a user providing a search term (or a group of search terms) as a search query for searching a document repository. In one implementation, the document repository includes documents available from the Internet and/or a database and the vehicle for searching this repository is a search engine, such as search engine 125 (FIG. 1). The user may provide the search query via web browser software on a client, such as client 110 (FIG. 1).

The search query may be received by the search engine and used to identify documents (e.g., books, magazines, newspapers, articles, catalogs, etc.) related to the search query (acts 305 and 310) (FIG. 3A). A number of techniques exist for identifying documents related to a search query. One such technique might include identifying documents that contain the search term or synonyms of the search term. When the search query includes more than one search term, then a technique might include identifying documents that contain the search terms as a phrase, that contain the search terms but not necessarily together, or that contain less than all of the search terms. Yet other techniques are known to those skilled in the art.

Optionally, the documents may be scored in some manner (act 315). For example, the score for a document may be based on an information retrieval (IR) score. Several techniques exist for generating an IR score. For example, an IR score for a document may be generated based on the number of occurrences of the search terms in the document text, where the search terms occur within the document (e.g., title, content, footer, header, etc.), or characteristics of occurrences of the search terms (e.g., font, size, color, etc.). Yet other techniques are known to those skilled in the art.

Search results may be formed based on the documents and their optional scores and presented to the user (act 320). In one implementation, the search results may include information associated with the documents, such as links to the documents, that may optionally be sorted based on the document scores. The search results may be provided as an HTML document, similar to search results provided by conventional search engines. Alternatively, the search results may be provided according to another format agreed upon by the search engine and the client (e.g., Extensible Markup Language (XML)).

Figure 4:
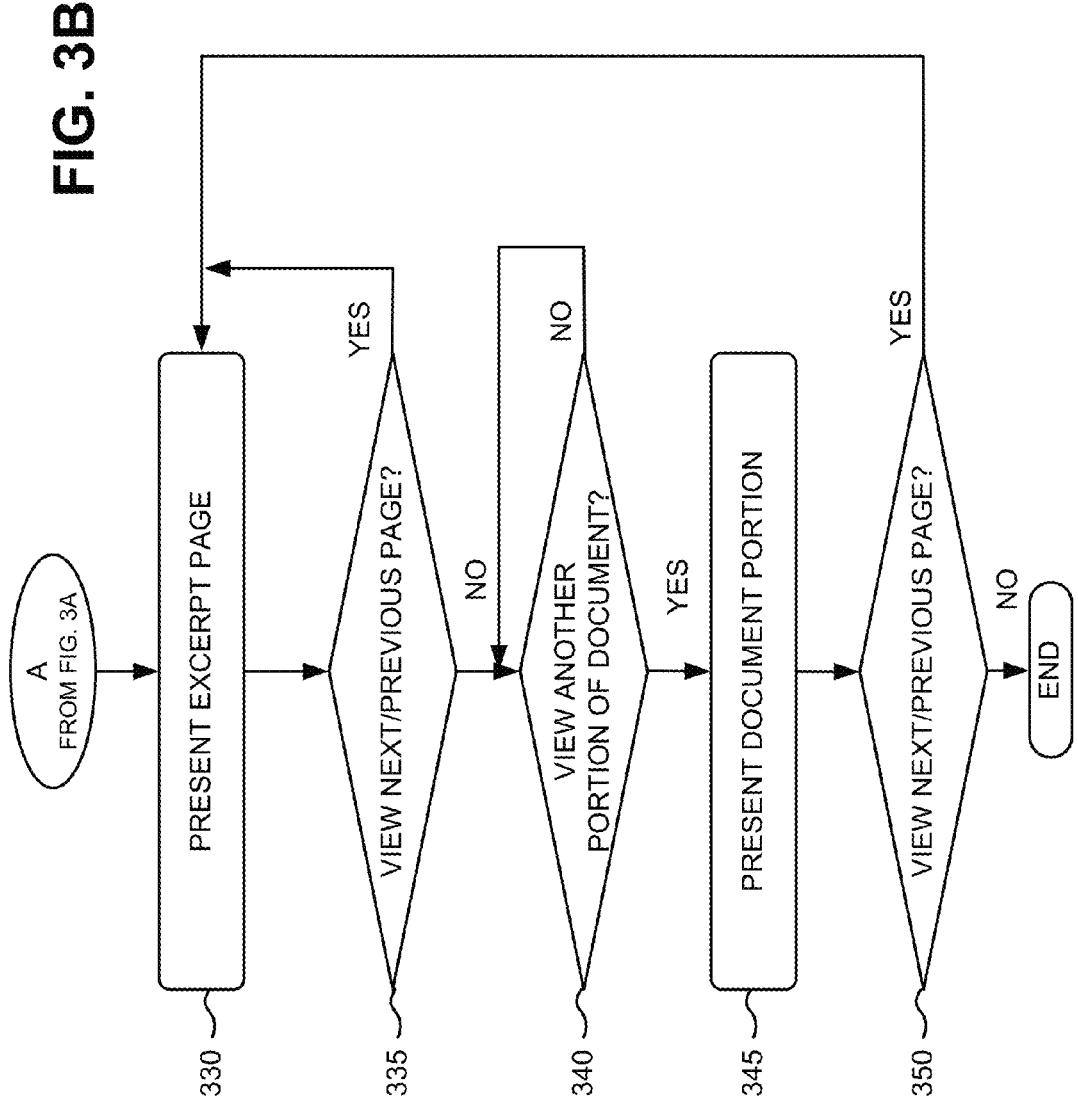
FIG. 4 is an exemplary diagram of a user interface for presenting search results according to implementations consistent with the principles of the invention.

FIG. 4 is an exemplary diagram of a user interface for presenting search results according to an implementation consistent with the principles of the invention. Assume that a user provided a search query that included the search term "memory" and a search was performed based on the search query to identify a set of documents related to the search query.

In one implementation, as shown in FIG. 4, a search result 410 may include a document title 412, author information 414, an excerpt 416 from the document, an address 418 associated with the document, links 420 to other relevant excerpts in the document, and an image 422 associated with the document. Document title 412 may include a title associated with the document. Selection of document title 412 may cause detailed information, possibly in the form of an excerpt page (described below), associated with the document to be presented. Author information 414 may include the name(s) of the author(s) of the document.

Excerpt 416 may include a portion of the document that includes a search term of the search query. Optionally, occurrences of the search term may be visually distinguished (e.g., highlighted) in the portion of the document. Excerpt 416 may also include a page number associated with the excerpt. In one implementation, selection of the page number (or excerpt 416) may result in presentation of detailed information, possibly in the form of an excerpt page (described below), associated with the document.

Address 418 may include an address at which the document is stored. Links 420 may permit one or more other excerpts from the document to be presented to the user. Image 422 may include an image of, for example, a front cover (or another portion) of the document (if available). In one implementation, image 422 includes a thumbnail version of the front cover of the document. Image 422 may optionally include an embedded link that, when selected, may result in presentation of detailed information, possibly in the form of an excerpt page (described below), associated with the document.

Returning to FIG. 3A, one of the documents in the search results may be selected by the user (act 325). In one implementation, selection of a document may include selection of a link associated with the document, such as selection of document title 412 (FIG. 4), excerpt 416, or image 422.

In one implementation consistent with the principles of the invention, detailed information regarding a document, possibly in the form of an excerpt page, may be presented to the user in response to the user selecting the document (act 330) (FIG. 3B).

Figure 5:
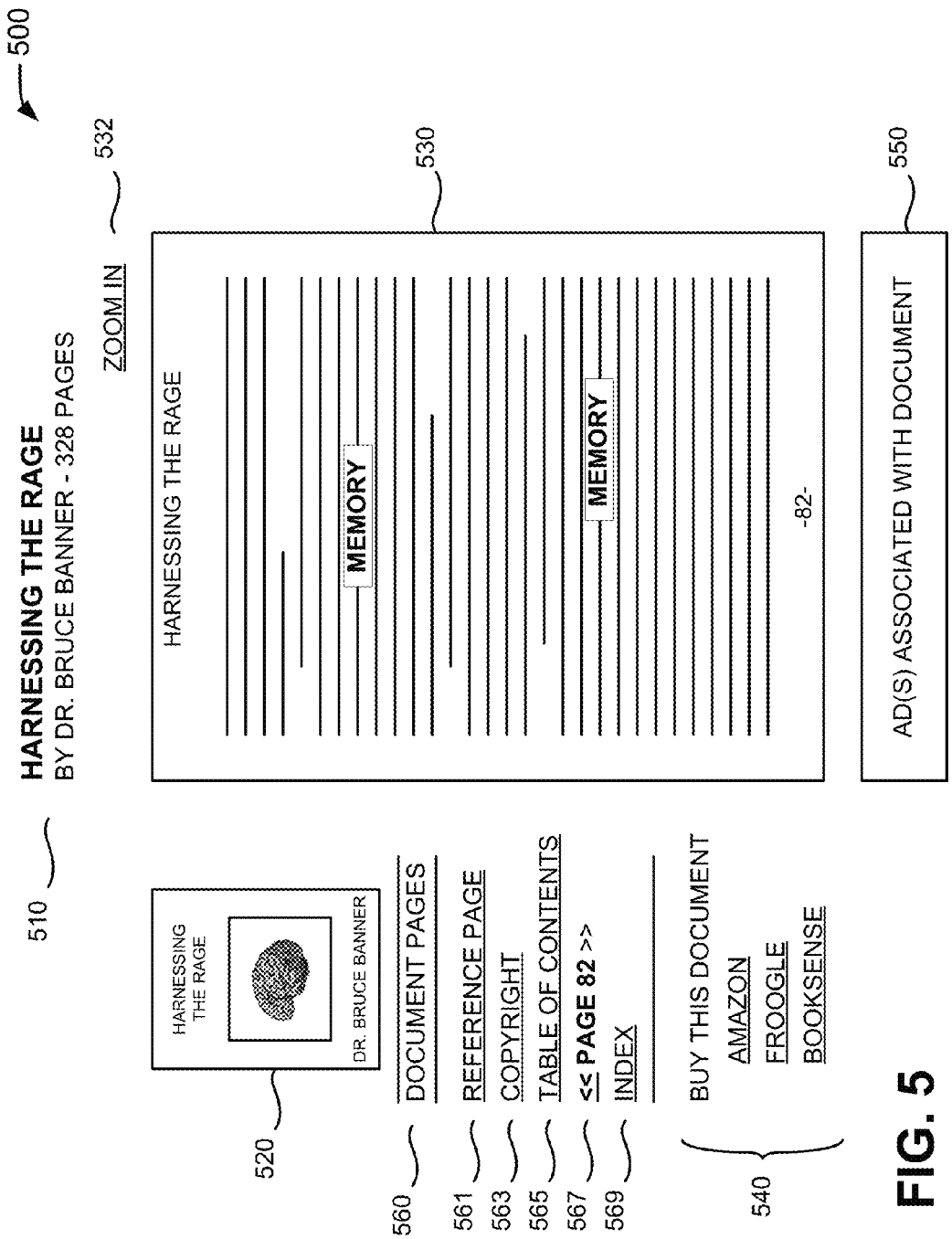
FIGS. 5 and 6 are exemplary diagrams of pages that may be presented according to an implementation consistent with the principles of the invention.

FIG. 5 is an exemplary diagram of an excerpt page 500 that may be presented according to an implementation consistent with the principles of the invention. Excerpt page 500 may include document title and author information 510, an image 520 associated with the document, an excerpt 530 from the document, a set of links 540 for purchasing the document, a set of advertisements 550 associated with the document, and links 560 to different portions of the document. In other implementations, excerpt page 500 may include more, fewer, or different types of information.

Document title and author information 510 may include a title associated with the document and/or the name(s) of the author(s) of the document. Image 520 may include an image of, for example, a front cover (or another portion) of the document (if available). In one implementation, image 520 may include a thumbnail version of the front cover of the document.

Excerpt 530 may include text from a page of the body of the document that may include a search term of the search query or another page of the document, such as a copyright page, a table of contents, or an index, within an excerpt window. Excerpt 530 may correspond to an image of the page text or the text version and, in one implementation, may include all or substantially all of the text from the page. Optionally, occurrences of the search term may be visually distinguished (e.g., highlighted) on the page. In another implementation, excerpt 530 may include text from a set of two (or more) pages. The pages may optionally be presented in a manner based on their corresponding page numbers.

A zoom feature 532 may be associated with excerpt 530. Zoom feature 532 may permit a user to zoom in (or zoom out) on a portion of the page presented in excerpt 530. Techniques for zooming in or out on a page are well known in the art.

Links 540 may permit a user to purchase the document. For example, selection of one of links 540 may cause a page associated with a document retailer or a set of document retailers to be presented to the user to aid the user is purchasing the document or a portion of the document. Advertisement(s) 550 may include a set of advertisements associated with a business that sells the document, other documents associated with the author, and/or documents relating to a same topic as the document.

Links 560 may include links to various portions of the document. For example, the links may reference a reference page 561, a copyright page 563, a table of contents 565, a currently or previously accessed page (e.g., a page from the body of the document that is currently or was previously presented in excerpt 530) 567, and/or an index 569 associated with the document. In other implementations, links 560 may reference more, fewer, or different portions of the document. Selection of one of links 561-569 may cause text of the corresponding page to be presented in excerpt 530.

Whichever one of links 561-569 that corresponds to the page presented in excerpt 530 may be replaced with text that corresponds to the link and previous and next page elements. The link text may be visually distinguished in some manner with regard to other ones of links 561-569. As shown in FIG. 5, page link 567 corresponds to page 82, which is currently presented in excerpt 530. In this case, page link 567 is replaced with text that corresponds to the link and previous and next page elements. The previous page and next page elements are visually associated with the text of page link 567 and are shown in FIG. 5 as arrows that permit a user to be presented with a previous page (e.g., page 81) or a next page (e.g., page 83) in the document. Optionally, the previous page and next page elements may indicate in some manner (e.g., by shading, color, or otherwise) whether a user is permitted to select a previous or next page. In some instances, a user may be restricted from accessing certain pages or more than a predetermined number of pages in a document.

Returning to FIG. 3B, it may be determined whether a next or previous excerpt page is desired (act 335). In one implementation, selection of a next or previous page element associated with the text of page link 567 may indicate a user's desire to be presented with a next or previous page in the document. In response to selection of a next or previous page element associated with the text of page link 567, a next or previous page in the document may be presented to the user (act 330). The text of page link 567 may then be updated based on the new page number.

It may also be determined whether another portion of the document (e.g., a reference page, a copyright page, a table of contents, or an index) is desired (act 340). In one implementation, selection of reference page link 561, copyright page link 563, table of contents link 565, or index link 569 may indicate a user's desire to be presented with another portion of the document. In response to selection of reference page link 561, copyright page link 563, table of contents link 565, or index link 569, a corresponding page in the document may be presented to the user (act 345).

Figure 6:
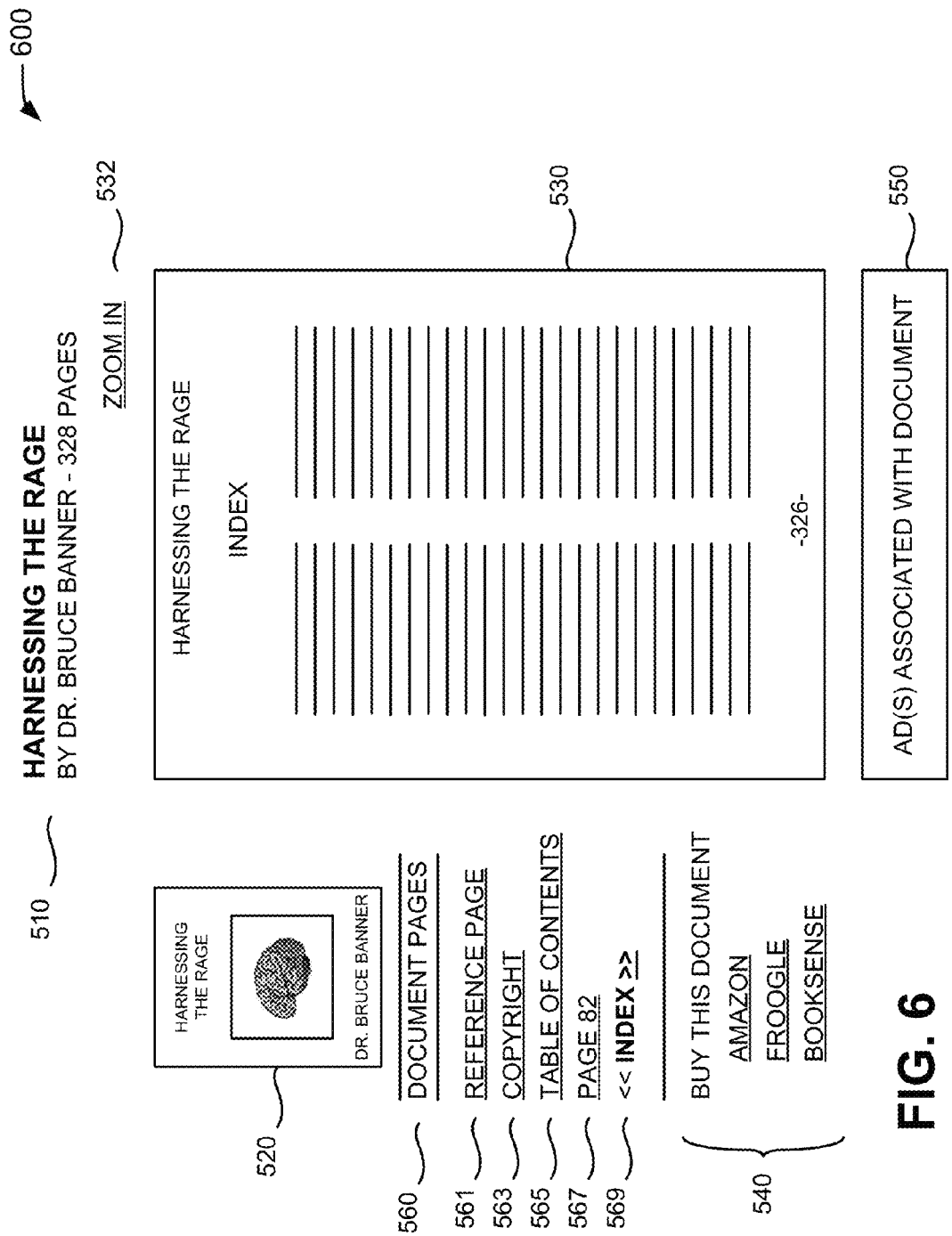

FIG. 6 is an exemplary diagram of an excerpt page 600 that may be presented according to an implementation consistent with the principles of the invention. Excerpt page 600 may include document title and author information 510, an image 520 associated with the document, an excerpt 530 from the document, a set of links 540 for purchasing the document, a set of advertisements 550 associated with the document, and links 560 to different portions of the document, as described above with regard to FIG. 5.

Assume that the user selected index link 569 in excerpt page 500 (FIG. 5). Accordingly, excerpt 530 in excerpt page 600 may include text of a page of the index of the document. Excerpt 530 may correspond to an image of the page text or the text version and, in one implementation, may include all or substantially all of the text from the page. In another implementation, excerpt 530 may include text from a set of two (or more) pages. The pages may optionally be presented in a manner based on their corresponding page numbers.

Page link 567 in excerpt page 600 includes a link to page 82 of the document (i.e., a page previously presented in excerpt 530). When selected, page link 567 may cause an excerpt page to be presented similar to excerpt page 500. Index link 569 in excerpt page 600 may be replaced with text that corresponds to the link and previous and next page elements. The link text may be visually distinguished in some manner with regard to links 561-567. The previous page and next page elements are visually associated with the text of link 569 and are shown in FIG. 6 as arrows that permit a user to be presented with a previous page or a next page of the index in the document. Optionally, the previous page and next page elements may indicate in some manner (e.g., by shading, color, or otherwise) whether a user is permitted to select a previous or next page. For example, the user may not be permitted to select a previous page when excerpt 530 corresponds to the first page of the index or select a next page when excerpt 530 corresponds to the last page of the index.

Returning to FIG. 3B, it may be determined whether a next or previous page is desired (act 350). In one implementation, selection of a next or previous page element associated with link 569 may indicate a user's desire to be presented with a next or previous page in the document. In response to selection of a next or previous page element associated with link 569, a next or previous page in the document may be presented to the user (act 330).

CONCLUSION

Systems and methods consistent with the principles of the invention may provide information regarding documents in a manner that is useful to the users.

The foregoing description of preferred embodiments of the present invention provides illustration and description, but is not intended to be exhaustive or to limit the invention to the precise form disclosed. Modifications and variations are possible in light of the above teachings or may be acquired from practice of the invention.

For example, while series of acts have been described with regard to FIGS. 3A and 3B, the order of the acts may be modified in other implementations consistent with the principles of the invention. Further, non-dependent acts may be performed in parallel.

It has been described that a document is identified as a result of a search. In other implementations, however, the document may be identified in other ways, such as from a directory, category, or other listing of documents.

Also, exemplary user interfaces have been described with respect to FIGS. 4-6. In other implementations consistent with the principles of the invention, the user interfaces may include more, fewer, or different pieces of information.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the present invention. Thus, the operation and behavior of the aspects were described without reference to the specific software code—it being understood that one of ordinary skill in the art would be able to design software and control hardware to implement the aspects based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   providing, by one or more processors and for presentation, an excerpt page of a document;
   providing, by the one or more processors and for presentation in the excerpt page, a plurality of links, each of the plurality of links being associated with a respective page of the document;
   receiving, by the one or more processors, a selection of a first link of the plurality of links presented in the excerpt page;
   providing, by the one or more processors and for presentation in the excerpt page, the respective page of the document associated with the first link based on the selection of the first link;
   modifying, by the one or more processors, the first link presented in the excerpt page, by replacing a portion of the first link with corresponding first link text, and including a first element next to the first link text and a second element next to the first link text, to create a modified first link based on the selection of the first link,
   the first element, when selected, causing a previous sequential page, with respect to the respective page associated with the first link, of the document to be presented in the excerpt page, and
   the second element, when selected, causing a next sequential page, with respect to the respective page associated with the first link, of the document to be presented in the excerpt page;

receiving, by the one or more processors, a selection of a second link of the plurality of links presented in the excerpt page, the second link being different than the first link;

replacing, by the one or more processors and based on receiving the selection of the second link, the modified first link presented in the excerpt page with the first link by removing the first element and the second element and replacing the first link text with the portion of the first link;

providing, by the one or more processors and for presentation in the excerpt page, the respective page of the document associated with the second link based on the selection of the second link; and modifying, by the one or more processors, the second link presented in the excerpt page, by replacing a portion of the second link with corresponding second link text, and including a third element next to the second link text and a fourth element next to the second link text, to create a modified second link based on the selection of the second link.

2. The method of claim 1, further comprising:

receiving a selection of a third link of the plurality of links presented in the excerpt page, the third link being different than the first link and being different than the second link;

replacing, based on receiving the selection of the third link, the modified second link with the second link by removing the third element and the fourth element and replacing the second link text with the portion of the second link;

providing, for presentation in the excerpt page, the respective page of the document associated with the third link; and modifying the third link presented in the excerpt page, by replacing a portion of third link with corresponding third link text, including a fifth element next to the third link text and a sixth element next to the third link text, to create a modified third link based on the selection of the third link.

3. The method of claim 1, further comprising:

receiving a selection of the first element; and providing, for presentation and based on receiving the selection of the first element, the previous sequential page of the document.

4. The method of claim 1, further comprising:

receiving a selection of the second element; and providing, for presentation and based on receiving the selection of the second element, the next sequential page of the document.

5. The method of claim 1, further comprising:

receiving a search query;

providing, for presentation and based on the received search query, one or more search results; and receiving a selection of a search result of the one or more search results, where the document is associated with the selected search result.

6. The method of claim 5, further comprising:

visually distinguishing, within the respective page associated with the first link, an occurrence of a search term associated with the search query.

7. The method of claim 1, further comprising:

providing, for presentation in the excerpt page, one or more advertisements associated with a business that sells the document, other documents associated with an author of the document, or other documents associated with a same topic as the document.

8. A device comprising:

a memory to store instructions; and a processor to execute the instructions to:

provide, for presentation, an excerpt page of a document;

provide, for presentation in the excerpt page, a plurality of links, each of the plurality of links being associated with a respective page of the document;

receive a selection of a first link of the plurality of links presented in the excerpt page;

provide, for presentation in the excerpt page, the respective page of the document associated with the first link based on the selection of the first link;

modify the first link presented in the excerpt page, by replacing a portion of the first link with corresponding first link text, and including a first element next to the first link text and a second element next to the first link text, to create a modified first link based on the selection of the first link, the first element, when selected, causing a previous sequential page, with respect to the respective page associated with the first link, of the document to be presented in the excerpt page, and the second element, when selected, causing to a next sequential page, with respect to the respective page associated with the first link, of the document to be presented in the excerpt page;

receive a selection of a second link of the plurality of links, the second link being different than the first link;

replace, based on receiving the selection of the second link, the modified first link presented in the excerpt page with the first link by removing the first element and the second element and replacing the first link text with the portion of the first link;

provide, for presentation in the excerpt page, the respective page of the document associated with the second link based on the selection of the second link; and modify the second link presented in the excerpt page, by replacing a portion of the second link with corresponding second link text, and including a third element next to the second link text and a fourth element next to the second link text, to create a modified second link based on the selection of the second link.

9. The device of claim 8, where the processor is further to:

receive a selection of a third link of the plurality of links presented in the excerpt page, the third link being different than the first link and being different than the second link;

replace, based on receiving the selection of the third link, the modified second link with the second link by removing the third element and the fourth element and replacing the second link text with the portion of the second link;

provide, for presentation in the excerpt page, the respective page of the document associated with the third link; and modify the third link presented in the excerpt page, by replacing a portion of third link with corresponding third link text, and including a fifth element next to the third link text and a sixth element next to the third link text, to create a modified third link based on the selection of the third link.

10. The device of claim 8, where the processor is further to:
receive a selection of the first element; and
provide, for presentation and based on receiving the selection of the first element, the previous sequential page of the document.

11. The device of claim 8, where the processor is further to:
receive a selection of the second element; and
provide, for presentation and based on receiving the selection of the second element, the next sequential page of the document.

12. The device of claim 8, where the processor is further to:
receive a search query;
provide, for presentation and based on the received search query, one or more search results; and
receive a selection of a search result of the one or more search results,
where the document is associated with the selected search result.

13. The device of claim 12, where
the respective page associated with the first link is an image of the respective page associated with the first link, and
the processor is further to:
visually distinguish, within the image of the respective page associated with the first link, an occurrence of a search term associated with the search query.

14. The device of claim 8, where the processor is further to:
provide, for presentation in the excerpt page, one or more advertisements associated with the document.

15. A non-transitory computer-readable storage medium storing instructions, the instructions comprising:
one or more instructions which, when executed by at least one processor, cause the at least one processor to:
provide, for presentation, an excerpt page of a document;
provide, for presentation in the excerpt page, a plurality of links,
each of the plurality of links being associated with a respective page of the document;
receive a selection of a first link of the plurality of links presented in the excerpt page;
provide, for presentation in the excerpt page, the respective page of the document associated with the first link based on the selection of the first link;
modify the first link presented in the excerpt page, by replacing a portion of the first link with corresponding first link text, and including a first element next to the first link text and a second element next to the first link text, to create a modified first link based on the selection of the first link,
the first element, when selected, causing a previous sequential page, with respect to the respective page associated with the first link, of the document to be presented in the excerpt page, and
the second element, when selected, causing to a next sequential page, with respect to the respective page associated with the first link, of the document to be presented in the excerpt page;
receive a selection of a second link of the plurality of links,
the second link being different than the first link;
replace, based on receiving the selection of the second link, the modified first link resented in the excerpt page with the first link by removing the first element and the second element and replacing the first link text with the portion of the first link;
provide, for presentation in the excerpt page, the respective page of the document associated with the second link based on the selection of the second link; and
modify the second link presented in the excerpt page, by replacing a portion of the second link with corresponding second link text, and including a third element next to the second link text and a fourth element next to the second link text, to create a modified second link based on the selection of the second link,
the third element, when selected, causing a previous sequential page, with respect to the respective page associated with the second link, of the document to be presented, and
the fourth element, when selected, causing to a next sequential page, with respect to the respective page associated with the second link, of the document to be presented.

16. The medium of claim 15, where the one or more instructions further include:
one or more instructions to receive a selection of a third link of the plurality of links presented in the excerpt page,
the third link being different than the first link and being different than the second link;
one or more instructions to replace, based on receiving the selection of the third link, the modified second link with the second link by removing the third element and the fourth element and replacing the second link text with the portion of the second link;
one or more instructions to provide, for presentation in the excerpt page, the respective page of the document associated with the third link; and
one or more instructions to modify the third link presented in the excerpt page, by replacing a portion of third link with corresponding third link text, and including a fifth element next to the third link text and a sixth element next to the third link text, to create a modified third link based on the selection of the third link,
the fifth element, when selected, causing a previous sequential page, with respect to the respective page associated with the third link, of the document to be presented in the excerpt page, and
the sixth element, when selected, causing to a next sequential page, with respect to the respective page associated with the third link, of the document to be presented in the excerpt page.

17. The medium of claim 15, where the one or more instructions further include:
one or more instructions to receive a selection of the first element; and
one or more instructions to provide, for presentation and based on receiving the selection of the first element, the previous sequential page of the document.

18. The medium of claim 15, where the one or more instructions further include:
one or more instructions to receive a selection of the second element; and one or more instructions to provide, for presentation and based on receiving the selection of the second element, the next sequential page of the document.

19. The medium of claim 15, where the one or more instructions further include:
   one or more instructions to receive a search query;
   one or more instructions to provide, for presentation and based on the received search query, one or more search results; and
   one or more instructions to receive a selection of a search result of the one or more search results,
   where the document is associated with the selected search result and the excerpt page of the document is provided based on the selection of the search result.

20. The medium claim 19, where the one or more instructions further include:
   one or more instructions to visually distinguish, within the respective page associated with the first link, an occurrence of a search term associated with the search query.

* * * * *